United States Patent Office 3,822,342
Patented July 2, 1974

3,822,342
PREPARATION OF NON-ETHER SOLVATED MACROCRYSTALLINE ALUMINUM HYDRIDE
Paul F. Reigler, Midland, and Lz F. Lamoria, Bay City, Mich., assignors to The Dow Chemical Company, Midland, Mich.
No Drawing. Filed Dec. 10, 1965, Ser. No. 513,061
Int. Cl. C01b 6/00
U.S. Cl. 423—645
4 Claims This invention relates to the preparation of aluminum hydride and more particularly is concerned with a novel process for preparing substantially non-ether solvated, particulate, macrocrystalline aluminum hydride.

In processes used heretofore to prepare substantially non-ether solvated, crystalline aluminum hydride in a macrocrystalline form, i.e. larger than 10 microns, it has been necessary to use relatively dilute ethereal reactant solutions to avoid premature crystallization of the aluminum hydride essentially all in sub-micron particles. To illustrate, the stoichiometric reaction of lithium aluminum hydride and aluminum chloride in diethyl ether at room temperature, i.e. about 15–25° C., gives a solution of aluminum hydride ($AlH_3$) which, if above about 0.6 molar in $AlH_3$ concentration, precipitates finely divided submicron size solvated aluminum hydride in about ten minutes or less.

In accordance with the process ordinarily employed in preparing substantially non-solvated crystalline aluminum hydride, preferably in macrocrystalline particles, a dilute ethereal solution of aluminum hydride prepared as set forth directly hereinbefore is heated at a temperature of from about 50° to about 85° C., preferably at from about 60° to about 80° C. and desirably at about 75° to about 80° C. for a period of from less than one hour to about 6 hours or more whereupon the macrocrystalline, substantially non-solvated aluminum hydride precipitates directly in the reaction medium. Usually the heating is carried out in the presence of one or more complex light metal hydrides, e.g. excess of lithium aluminum hydride over that required stoichiometrically for aluminum hydride preparation, lithium borohydride, sodium borohydride and the like.

Now, unexpectedly, the present invention provides a novel process for preparing substantially non-solvated, macrocrystalline aluminum hydride utilizing concentrated ethereal aluminum hydride reactant solutions. A principal advantage of the present invention is that markedly less ether solvent is employed than in processes practiced heretofore. This in turn provides for the use of less bulky handling, storage and processing equipment as well as eliminates the need for evaporation, handling and removal of large quantities of excess ether from the mixtures resulting in the production of the macrocrystalline aluminum hydride.

It is also an object of the present invention to provide a method whereby ethereal aluminum hydride solutions having an aluminum hydride concentration in excess of one molar can be kept for extended periods of time without precipitation of macrocrystalline ether solvated aluminum hydride therein.

These and other objects and advantages will become apparent from the detailed description presented hereinafter.

The present invention comprises reacting, in an ether solvent for aluminum hydride ($AlH_3$), lithium aluminum hydride ($LiAlH_4$) and aluminum chloride ($AlCl_3$) in substantially stoichiometric quantities as required to prepare aluminum hydride in accordance with the equation:

$$AlCl_3 + 3LiAlH_4 \rightarrow 4AlH_3 + 3LiCl$$

This step is carried out by admixing the reactants in an ether material which acts as a solvent for aluminum hydride while maintaining the reaction mixture at a temperature of from about minus 5 to about minus 30° C., preferably at from about minus 5 to about minus 25° C. At temperatures much above minus 5° C. at solutions about 1 molar or greater in aluminum hydride undesirable precipitation of extremely finely divided aluminum hydride etherate occurs. At temperatures lower than about minus 30° C. there is substantially no reaction between the $LiAlH_4$ and $AlCl_3$; the solutions merely mix without reaction. Solvents suitable for use in the present novel process include, for example, diethyl ether, dimethyl ether, tetrahydrofuran, di-propyl ether and the like. Diethyl ether ordinarily is employed.

The reactant concentrations are controlled such that the resulting ethereal aluminum hydride solution, at a maximum, is about 3 molar in aluminum hydride concentration and usually is maintained to provide an ethereal aluminum hydride solution ranging from above about 1 to about 3 molar in aluminum hydride.

Ordinarily, the solid lithium chloride which is coproduced is removed from the low temperature aluminum hydride solution by filtering, centrifuging or other solid-liquid separation techniques.

The resulting concentrated aluminum hydride solution can be stored at the processing temperatures for an extended period of time, e.g. three hours or more without any solvated aluminum hydride precipitating therein.

In preparing and recovering macrocrystalline, substantially non-solvated aluminum hydride from the ethereal aluminum hydride solution, the solution at a temperature of from about minus 5 to about minus 30° C. is added slowly, e.g. in a dropwise manner, to a refluxing mixture of lithium aluminum hydride and an alkali metal borohydride (i.e. lithium borohydride or sodium borohydride or mixtures thereof) in an ether-inert organic liquid solvent system maintained at a reflux temperature of from about 76 to about 80° C., usually at from about 76 to about 78° C. and preferably at from about 76.5 to about 77° C. At temperatures lower than about 76° C. substantially no conversion to the macrocrystalline product is realized. At temperatures above about 80° C., substantially all of the product precipitates as submicron crystals which show essentially no growth during the refluxing period.

The inert liquid solvent should be inert to the aluminum hydride product; i.e. it should not react detrimentally with the reaction mixture so as to destroy or change the product and preferably should have a boiling point of about 80° C. Liquid hydrocarbons such as, for example, benzene, toluene, biphenyl, xylene, biphenylbenzene, decane and the like particularly are suitable for use in admixture with the ether to provide the solvent system for the refluxing operation. Benzene ordinarily is used. The amount of the inert organic liquid to be used is not critical except that the amount should be sufficient to produce the desired refluxing temperature in the reaction mixture.

As the ethereal aluminum hydride solution is added to the refluxing lithium aluminum hydride-alkali metal borohydride mixture, the predetermined reflux temperature usually is maintained within the operable range by removal of ether therefrom. Alternatively, additional quantities of the inert solvent can be added to the reaction mixture during the reflux or the system can be pressurized to provide the operating temperature. Further, a combination of increased pressure and inert solvent addition or ether removal can be employed to achieve a predetermined refluxing temperature.

The ratios (gram molar basis) of lithium aluminum hydride:aluminum hydride:alkali metal borohydride are predetermined such that when the aluminum hydride addition is complete these are present in the refluxing reaction mass within the range of from about 0.5:2:1 to about 1:8:1.

Refluxing of the resulting lithium aluminum hydride-aluminum hydride-alkali metal borohydride containing reaction mixture is continued after the aluminum hydride addition until precipitation of the substantially non-solvated, macrocrystalline aluminum hydride essentially is complete. Ordinarily, the total reflux time, as determined from the start of aluminum hydride solution addition ranges from about 0.5 to about 3 hours or more.

The resulting macrocrystalline aluminum hydride crystals readily can be recovered from the reaction product mixture by solid-liquid separation procedures as set forth hereinbefore.

The large crystals of substantially non-solvated aluminum hydride produced by the present novel process find high utility in propellant compositions. These crystals offer ease of handling and storage both from the standpoint of formulation and safety. They show a markedly decreased reactivity in air and increased resistance to flashing and burning over sub-micron particulate aluminum hydride.

In propellant formulation these large particles, particularly those having a hexagonal crystal form, exhibit excellent compatibility and readily blend with other mix ingredients.

The present invention is illustrated further by the following examples but is not meant to be limited thereto.

Example 1

About 23.5 milliliters of a 2.56 molar solution of lithium aluminum hydride in diethyl ether (2.28 g. LiAlH$_4$) was placed in an addition funnel and connected to a reaction flask. Twenty-one milliliters of a 0.94 molar solution of substantially anhydrous aluminum chloride in diethyl ether (2.66 grams AlCl$_3$) was placed in a second addition funnel and this also was connected, through a separate connector, to the reaction flask.

The LiAlH$_4$ solution was transferred to the reaction flask and cooled to about minus 23° C. by placing the flask in a Dry Ice-acetone bath having a temperature of about 37° C. The solution was maintained at the indicated temperature and the aluminum chloride added with stirring over a two minute period. Following completion of the aluminum chloride addition, the resulting mixture was stirred for about one minute. During the addition and stirring operation, crystals of lithium chloride formed in the reaction mass; the aluminum hydride product solution (~1.8 molar in AlH$_3$ concentration; i.e. a total of about 80 millimoles of AlH$_3$) was separated from this by-product by pressure filtering through a medium porosity sintered glass frit into another addition funnel. The temperature of the filtrate was maintained at a temperature between about minus 5 and minus 10° C. using a Dry Ice-acetone bath. No precipitation of aluminum hydride was observed in this concentrated product solution.

The addition funnel containing the aluminum hydride product solution, while being maintained at a temperature of from about minus 5 to about minus 10° C., was connected to a refluxing solution (76–77° C.) comprising 455 milliliters of benzene, 20 milliliters of diethyl ether, 15 milliliters of a 1 molar solution of lithium aluminum hydride in diethyl ether (15 millimoles of LiAlH$_4$) and 22 milliliters of a 0.9 molar solution of lithium borohydride in diethyl ether (20 mollimoles of LiBH$_4$). While maintaining the aluminum hydride solution at from minus 5 to minus 10° C., it was added dropwise at an addition rate of about 1.3 milliliters per minute to the refluxing mass. In order to maintain the refluxing temperature within the indicated range, approximately 26 milliliters of ether was removed during the addition. The resulting reaction mass had a mole ratio of LiAlH$_4$:AlH$_3$:LiBH$_4$ of 0.75:4:1.

The reflux was continued for about 105 minutes from the start of the aluminum hydride addition until termination of the run. During this reaction period white crystalline aluminum hydride in particle size of larger than 10 microns formed in the reaction mixture. This product was separated from the residual product solution, washed with diethyl ether and dried.

Analysis of the product crystals showed these to be a hexagonal, substantially non-solvated aluminum hydride having a unit cell dimension of about $a=4.44\pm.02$A. and $c=5.89\pm.02$A. as determined from the X-ray powder diffraction pattern. The product had a density of greater than about 1.4 grams per cubic centimeter and a characteristic X-ray powder diffraction pattern corresponding to that presented in Table I.

TABLE I

| d | I/I$_o$ | d | I/I$_o$ |
|---|---|---|---|
| 3.85 | 10 | 1.110 | 2 |
| 3.22 | 100 | 1.072 | 3 |
| 2.34 | 25 | 1.048 | 3 |
| 2.22 | 19 | 1.034 | 3 |
| 1.965 | 4 | 1.002 | 3 |
| 1.825 | 11 | 0.982 | 0.5 |
| 1.607 | 11 | 0.965 | 2 |
| 1.469 | 17 | 0.948 | 1 |
| 1.410 | 11 | 0.914 | 2 |
| 1.374 | 6 | 0.897 | 1 |
| 1.300 | 7 | 0.871 | 1.5 |
| 1.280 | 4 | 0.863 | 1.5 |
| 1.166 | 2 | 0.843 | 1.5 |
| 1.126 | 2 | 0.837 | 1.5 |

In Table I, "d" is the interplanar spacing and "I/I$_o$" is the relative line intensity compared to the strongest line based at 100.

The aluminum hydride product was substantially insoluble in diethyl ether, inert to hydrazine and was soluble in tetrahydrofuran.

Product yield based on all steps of the process was about 51%.

EXAMPLE 2

The same technique, reactants and concentrations as were employed in Example 1 were used to prepare an aluminum hydride solution.

This solution, at a temperature of from about minus 5 to about minus 10° C., was added dropwise at an addition rate of 1.1 milliliters per minute to a complex metal hydride solution refluxing at a temperature of 76–77° C. following the procedure set forth in Example 1. The complex metal hydride solution comprised 520 milliliters of benzene, 10 milliliters of a 1 molar solution of lithium aluminum hydride in diethyl ether (10 millimole of LiAlH$_4$), 11 milliliters of a 0.9 molar solution of lithium borohydride in diethyl ether (10 millimoles of LiBH$_4$) and 31 milliliters of diethyl ether. The final reaction mixture contained a mole ratio of LiAlH$_4$:AlH$_3$:LiBH$_4$ of 1:8:1. The reflux temperature was maintained at the indicated range by removal of 22 milliliters of diethyl ether from the reaction mass during the aluminum hydride addition. A total reaction time of 90 minutes from the start of aluminum hydride addition till termination of reflux was employed.

White, macrocrystalline aluminum hydride product started to form in the reaction mass shortly after the aluminum hydride addition was started. Analysis of this crystalline aluminum hydride recovered from the product solution indicated this to be the same hexagonal material as was produced in Example 1.

The particle size ranged from about 10 to about 50 microns.

EXAMPLE 3

Aluminum hydride solutions of various predetermined concentrations were prepared following the same general technique and operating conditions described in Example 1. In these runs stoichiometric quantities of lithium aluminum hydride and substantially anhydrous aluminum chloride in diethyl ether solution or an anhydrous aluminum chloride monodiethyl etherate corresponding to the formula [AlCl$_3$·(C$_2$H$_5$)$_2$O] were reacted. After separation of the by-product lithium chloride, the resulting aluminum hydride solutions were stored for extended periods of time, over 3 hours, at temperatures of from minus 5 to minus 10° C. In all cases, no precipitate formed in the aluminum hydride product solution. Table II summarizes the data for the runs carrieds out in this study.

TABLE II

| Run No. | LiAlH₄ ether sol'n | | AlCl₃ ether sol'n | | AlH₃ product sol'n | |
|---|---|---|---|---|---|---|
| | Ml. | Molarity | Ml. | Molarity | Ml. | Molarity |
| 1 | 40.5 | 1.42 | 21 | 0.94 | 61.5 | 1.3 |
| 2 | 32.3 | 1.86 | 21 | 0.94 | 53.3 | 1.5 |
| 3 | 21.0 | 2.87 | 21 | 0.94 | 42.0 | 1.9 |
| 4 | 43 | 2.81 | 10 | (*) | 53.0 | 3.0 |

*Added as 8.27 g. of the complex AlCl₃·(C₂H₅)₂O dissolved in 10 milliliters diethyl ether.

Each of the aluminum hydride product solutions was used to prepare macrocrystalline, substantially non-solvated aluminum hydride following the process conditions set forth in Example 1. In all cases, the hexagonal crystalline product described in Example 1 was realized.

Example 4

The process described in Example 1 was repeated except that the temperature of the refluxing reaction mixture was maintained at about 80° C. Thhe macrocrystalline, substantially non-solvated aluminum hydride resulting from this run was found to be a light weight material having an X-ray powder diffraction pattern as set forth in Table III.

TABLE III

| d | I/I₀ | d | I/I₀ | d | I/I₀ |
|---|---|---|---|---|---|
| 4.55 | 30 | 1.96 | 2 | 1.45 | 7 |
| 4.33 | 63 | 1.85 | 5 | 1.438 | 8 |
| 3.93 | 18 | 1.80 | 5 | 1.419 | 8 |
| 3.69 | 75 | 1.75 | 13 | 1.398 | 9 |
| 3.48 | 50 | 1.73 | 8 | 1.361 | 4 |
| 3.02 | 50 | 1.705 | 18 | 1.336 | 14 |
| 2.88 | 100 | 1.66 | 10 | 1.302 | 5 |
| 2.68 | 25 | 1.61 | 4 | 1.288 | 3 |
| 2.40 | 30 | 1.545 | 10 | 1.230 | 3 |
| 2.31 | 75 | 1.525 | 25 | 1.218 | 8 |
| 2.26 | 25 | 1.51 | 3 | 1.166 | 4 |
| 2.08 | 40 | 1.48 | 7 | 1.152 | 5 |
| | | | | 1.108 | 5 |

In a manner similar to that described for the foregoing Examples, substantially non-solvated, marcocrystalline aluminum hydride can be prepared by reacting stoichiometric quantities of lithium aluminum hydride and aluminum chloride in an ether solvent, such as dimethyl ether, tetrahydrofuran, dipropyl ether, at concentrations to provide an aluminum hydride solution from about 1 to about 3 molar while maintaining the temperature at from about minus 5 to about minus 30° C. The resulting aluminum hydride solution, after separating the co-produced lithium chloride therefrom, can be stored indefinitely at the indicated temperature or can be added directly to a refluxing solution at about 76–80° C. and preferably 76.5–77° C. of lithium aluminum hydride and sodium borohydride or a mixture of lithium aluminum hydride and sodium borohydride and lithium borohydride in an inert organic liquid-ether carrier. For this operation, the cold ethereal aluminum hydride solution is added slowly in dropwise fashion, as a thin film, sheet or stream or by other controlled flow rate addition procedures to the refluxing reaction mass. The resulting reaction mixture is controlled to have a lithium aluminum hydride:aluminum hydride:alkali metal borohydride mole ratio of from about 0.5:2:1 to about 1:8:1. Refluxing of this reaction mixture for a total period of from about 0.5 to about 3 hours provides directly in the reaction mass a macrocrystalline, substantially non-solvated aluminum hydride having particles substantially all larger than about 10 microns and from the most part ranging from about 10 to about 50 microns.

Various modifications can be made in the process of the present invention without departing from the spirit or scope thereof for it is understood that we limit ourselves only as defined in the appended claims.

We claim:

1. In a process for preparing substantially non-ether solvated, macrocrystalline aluminum hydride by heating an ethereal aluminum hydride solution in a refluxing mixture of lithium aluminum hydride and an alkali metal borohydride in an ether-inert organic liquid solvent system the improvement which comprises;
   slowly adding an ethereal solution of aluminum hydride maintained at a temperature of from about minus 5 to about minus 30° C. to a refluxing mixture of lithium aluminum hydride and an alkali metal borohydride in an ether-inert organic liquid solvent system maintained at a reflux temperature of from about 76 to about 80° C., said ethereal solution of aluminum hydride at a maximum being about 3 molar in aluminum hydride concentration, the quantities of lithium aluminum hydride:aluminum hydride:alkali metal borohydride in the reaction mixture having a ratio, on a molar basis, ranging from about 0.5:2:1 to about 1:8:1, and refluxing the reaction mixture for a period of time to provide precipitation of substantially non-ether solvated, macrocrystalline aluminum hydride in said reaction mixture.

2. The process as defined in Claim 1 and including the steps of reacting lithium aluminum hydride and aluminum chloride in ether solution and in quantities substantially stoichiometrically required to prepare aluminum hydride, said solution ranging in concentration from about 1 to about 3 molar in aluminum hydride, and removing co-produced by-product particulate lithium chloride from the ethereal aluminum hydride solution prior to adding said solution to the refluxing lithium aluminum hydride and alkali metal borohydride containing reaction mixture.

3. The process as defined in Claim 1 wherein diethyl ether is the solvent for aluminum hydride and the diethyl ether solution at a temperature of from about minus 5 to about minus 25° C. is added slowly to a refluxing mixture of lithium aluminum hydride and lithium borohydride in a diethyl ether-benzene liquid solvent system maintained at a reflux temperature of from about 76 to about 78° C.

4. The process as defined in Claim 3 wherein the reflux temperature of the reaction mixture is maintained at from about 76.5°–77° C. for a period of from about 0.5 to about 3 hours.

References Cited
UNITED STATES PATENTS
3,092,648   6/1963   Koster _____ 23—204 X OTHER REFERENCES
Rice, Jr. PB Report 127,867, "Non-Solvated Aluminum Hydride," 1956, pp. 1 to 6.
Hoffman, LMSD–703150, "Aluminum Hydride," 1960, pp. 1 to 19.

LELAND A. SEBASTIAN, Primary Examiner

U.S. Cl. X.R.
149—109

UNITED STATES PATENT OFFICE
CERTIFICATE OF CORRECTION

Patent No. 3,822,342   Dated July 2, 1974

Inventor(s) Paul F. Reigler and Lz F. Lamoria

It is certified that error appears in the above-identified patent and that said Letters Patent are hereby corrected as shown below:

Column 3, line 40, delete "37° C." and insert --minus 37° C.--.

Column 5, Table III, last column, should read as follows:

$I/I_o$

7

8

8

9

4

15

3

3

8

4

5

4

5

Signed and sealed this 1st day of October 1974.

(SEAL)
Attest:

McCOY M. GIBSON JR.
Attesting Officer

C. MARSHALL DANN
Commissioner of Patents